United States Patent [19]

Bartmann et al.

[11] Patent Number: 4,537,948
[45] Date of Patent: Aug. 27, 1985

[54] PROCESS FOR THE PRODUCTION OF POLYPHENYLENE OXIDES

[75] Inventors: Martin Bartmann, Recklinghausen; Hanns-Jorg Bax; Klaus Burzin, both of Marl; Wilfried Ribbing, Dorsten, all of Fed. Rep. of Germany

[73] Assignee: Chemische Werke Huls AG, Marl, Fed. Rep. of Germany

[21] Appl. No.: 582,711

[22] Filed: Feb. 23, 1984

[30] Foreign Application Priority Data

Apr. 16, 1983 [DE] Fed. Rep. of Germany ....... 3313864

[51] Int. Cl.³ .............................................. C08G 65/44
[52] U.S. Cl. .................... 528/215; 528/212; 528/214; 528/216; 528/218
[58] Field of Search ............... 528/212, 214, 215, 216, 528/218

[56] References Cited

U.S. PATENT DOCUMENTS

| | | | |
|---|---|---|---|
| 3,642,699 | 2/1972 | Cooper et al. | 528/216 |
| 4,028,341 | 6/1977 | Hay | 528/216 |
| 4,059,568 | 11/1977 | Cooper | 528/216 |
| 4,092,294 | 5/1978 | Bennett, Jr. et al. | 528/216 |
| 4,196,278 | 4/1980 | Bennett, Jr. et al. | 528/216 |
| 4,429,106 | 1/1984 | Burzin et al. | 528/216 |
| 4,440,923 | 4/1984 | Bartmann et al. | 528/216 |

OTHER PUBLICATIONS

Polymerization Processes, vol. 29 (1977), "Polymerizations by Oxidative Coupling", Finkbeiner et al., pp. 540–581.

*Primary Examiner*—Lester L. Lee
*Attorney, Agent, or Firm*—Oblon, Fisher, Spivak, McClelland & Maier

[57] ABSTRACT

A process for the production of polyphenylene oxides by the oxidative coupling of a diorthosubstituted phenol of the formula:

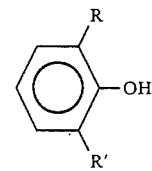

wherein R and R' are an n-alkyl radical with 1 to about 6 carbon atoms or a phenyl radical in the presence of an oxidizing gas and an activated copper(II)-amine catalyst made of copper(II) salts, secondary aliphatic or cyclic amines having about 4 to 10 carbon atoms, and hydrobromides of the same or different secondary aliphatic or cyclic amines having about 4 to 10 carbon atoms, in a solvent mixture of a $C_6$–$C_8$ aromatic hydrocarbon and a $C_1$–$C_4$ aliphatic alcohol.

15 Claims, No Drawings

PROCESS FOR THE PRODUCTION OF POLYPHENYLENE OXIDES

BACKGROUND OF THE INVENTION

1. Field of the Invention

This invention relates to a process for producing polyphenylene oxides.

2. Description of the Prior Art

Polyphenylene oxides and numerous processes for producing them are known. Cf., for example, Buehler "Spezialplaste," Adademieverlag, Berlin, 1978. In industry, one successful process entails the oxidative coupling of diorthosubstituted phenols in the presence of oxygen by copper-amine complexes.

In the process of DBP No. 15 70 683, a catalyst of a copper (II)-amine salt complex of the formula Cu-(OX)X.RR'—NH is used, wherein X is an acid anion, R and R' are alkyl radicals and R' can also be hydrogen. This catalyst assumes the role of an oxygen carrier. The active complex is produced by mixing a copper (II) salt with copper (II) hydroxide, or by adding a base to a copper (II) salt, in the presence of a primary or secondary aliphatic amine. Alternatively, a similar complex can also be formed during polycondensation, by reacting a copper (I) salt and an amine of the formula RR'—NH, and oxidizing the resulting complex. However, complexes of these amines are not active with non-basic copper (II) salts or copper (II) hydroxide. The reaction is usually quenched by the addition of an inorganic acid or a base. Thus, DE-PS No. 15 70 683 disclosed the first technically usable process for the production of polyphenylene oxides (PPO).

Unfortunately, drawbacks soon become apparent in the large-scale application of this process. For example, high catalyst concentrations are required to reach an acceptable reaction rate and degree of polymerization. Moreover, copper-amine complexes with higher catalytic activity require more costly components, for example, anhydrous copper salts, special amines, and additional metal bromides. For this reason, it is always harder to separate the PPO from the amine and the residual catalyst ingredients. An expensive recycling is required to recover the amines.

Further, the use of oxygen as an oxidizing agent involves the risk of fire and explosion, in addition to the higher costs in comparison with the use of air. However, many of the processes of the prior art involve the use of oxygen; in others the reaction rate drops drastically by using air, so that the PPO production becomes uneconomical.

Also, the formation of colored by-products, such as diphenoquinone, is very bothersome. Complete separation from the PPO is difficult.

The most important processes are listed below:

DE-PS No. 16 45 515 (U.S. Pat. No. 3,384,619) describes a process for polycondensation of phenols to high molecular weight polyphenylene oxides, in which a catalyst containing a tertiary amine and a nonbasic copper(II) halide is used. The catalyst concentration in this process is unusually high. With the use of 9 parts of amine per one part of phenol, the entire process is economically unattractive.

According to DE-PS No. 20 11 709 (U.S. Pat. No. 3,639,656) a complex of a primary or secondary amine with an anhydrous, nonbasic copper(II) salt is used. In this way, the amount of catalyst is reduced to 0.01 mole of copper and 0.15 mole of amine per mole of phenol. It is especially important that the copper salts used are anhydrous.

DE-PS No. 20 11 711 (U.S. Pat. No. 3,661,848) describes a process for the production of PPO in the presence of a nonbasic copper(II) salt, a straight-chain aliphatic amine and a low molecular alcohol in an amount of less tnan 5, preferably 0.5 to 3 percent by volume. Oxygen is used as the oxidizing agent.

According to the process of DE-PS No. 22 17 161 (US-PS 3 989 671) a catalyst of certain copper(II) salts, tertiary diamines and an iodine compound is used. While it is possible with this process to obtain PPO having a viscosity of 1.3 dl/g, the use of the costly iodine compound is not justified.

DE-PS No. 22 28 071 (U.S. Pat. No. 3,733,299) describes a catalyst containing an alkaline-earth metal bromide besides a mono- or bivalent copper salt and an amine. Oxygen is required as the oxidizing agent. The use of metal bromides has the drawback that processing is complicated by the presence of the additional metal ions.

DE-OS No. 24 60 326 (U.S. Pat. No. 3,900,445) describes a catalyst of an anhydrous copper(I) and copper-(II) salt and a primary, secondary or tertiary amine. In this way, the use of oxygen is improved, although the danger of fire and explosion in the reactor remains.

DE-OS No. 25 05 328 (U.S. Pat. No. 4,028,341) describes a catalyst of a copper(I) or copper(II) salt, a bromide ion and at least a secondary alkylenediamine and a tertiary monoamine.

In addition, the catalyst of DE-OS No. 27 38 889 (U.S. Pat. No. 4,092,294) consists of a secondary monoamine. Apart from the problem of the availability of this amine, there is the additional problem of having to process a complicated amine mixture. A further drawback of both of these processes is that the amine components, in keeping with their respective volatility, are carried off from the reaction in varying degrees by the gas introduced. In this way the activity of the catalyst during the reaction can change.

To remedy this drawback it is proposed in DE-OS No. 29 13 204 (U.S. Pat. No. 4,211,857) to circulate the gas, which has been introduced in the reaction system, in a closed system, then separating the entrained amine by cooling and replacing the used oxygen continuously.

DE-OS No. 30 35 599 mentions as substantial drawbacks of the known processes the accumulation of dangerous explosive gas mixtures in the reaction chamber and formation of the by-product diphenoquinone, which is hard to separate from the PPO (cf. DE-OS No. 21 34 095=U.S. Pat. No. 3,637,593). However, as before, the examples teach the use of pure oxygen and anhydrous copper salts. Therefore, this solution is not convincing.

German Patent Application Nos. P 32 24 692.7 and 32 24 691.9 disclose PPO production processes in which morpholinium bromide or polyhydric alcohols and aqueous alkaline-earth hydroxide solutions are used as activator combinations in determined molar ratios. It is indicated that the J values, which are used as the measurement of the rate of polymerization, are considerably improved in comparison with the processes in which only one of the components morpholinium bromide, polyhydric alcohols or alkali hydroxides is used as activator. The high amounts of amine, required by this process, are disadvantageous.

Hence, all of these processes show the difficulties involved in the oxidative coupling of diorthosubstituted phenols to produce polyphenylene oxides. Accordingly, a need continues to exist for a process for oxidatively coupling diorthosubstituted phenols which produces polyphenylene oxides in a safe and simple manner.

SUMMARY OF THE INVENTION

Accordingly, it is an object of the present invention to provide a process for oxidatively coupling diorthosubstituted phenols which produces polyphenylene oxides in a simple manner.

It is also an object of this invention to provide a process for oxidatively coupling diorthosubstsituted phenols which produces polyphenylene oxides in a safe manner without the danger of explosion from oxygen gas.

Moreover, it is an object of this invention to provide a process for oxidatively coupling diorthosubstituted phenols which produces polyphenylene oxides in such a manner that the formation of diphenoquinone is reduced.

Further, it is an object of the present invention to provide a process for oxidatively coupling of diorthosubstituted phenols which produces polyphenylene oxides in high yield.

According to the present invention, the foregoing and other objects are attained by providing a process for the production of polyphenylene oxides which comprises oxidatively coupling a diorthosubstituted phenol having the formula:

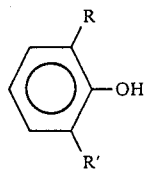

wherein R and R' are an n-alkyl radical with 1 to about 6 carbon atoms or a phenyl radical in the presence of an oxidizing gas and an activated copper(II)-amine catalyst, comprising a mixture of a copper salt $CuX_2$, wherein X is the anion of an organic acid or an inorganic acid; a secondary aliphatic or cyclic amine; and a hydrobromide of the same or a different secondary aliphatic or cyclic amine, in a solvent mixture of an aromatic hydrocarbon and a lower aliphatic alcohol, thereby preventing precipitation of the formed polyphenylene oxide during reaction.

DETAILED DESCRIPTION OF THE PREFERRED EMBODIMENTS

According to the present invention, a process for producing polyphenylene oxides (PPO) has now been found by which the drawbacks of the conventional processes may be overcome. While processes for the production of polyphenylene oxides are known, it is surprising, indeed that the combination of factors, according to the present invention, now makes it possible to produce polyphenylene oxides in such a simple manner.

Tne process according to the invention has the following advantages:

1. An extremely simple copper-amine catalyst is used in low concentrations.

2. The process makes possible the use of air or a non-explosive mixture of inert gas and oxygen.

3. Diphenoquinone formation can be reduced.

4. The process leads to the best results if at least 10% of the aromatic solvent is replaced by the less expensive methyl alcohol.

5. J values of over 75 ml/g are achieved in a reaction time of 100 minutes. If lower J values are sufficient for given applications, the reaction time can be further shortened.

6. The PPO yield is over 95%.

The catalyst is produced most simply by dissolving the copper salt in hydrobromic acid and subsequent combination with the secondary amine. The sequence can be changed with copper salts that are soluble in secondary amines. Finally, dissolution of the copper salts in a part or all the amount of the aliphatic solvent is possible. Slightly soluble copper(II) salts, which do not dissolve under said conditions, such as copper(II) sulfide or cyanide, must be solubilized in a suitable way.

Suitable copper salts comprise bivalent salts with inorganic and organic acids, for example, copper(II) chloride, copper(II) bromide, copper(II) sulfate and copper(II) acetate. Basic copper compounds, for example, copper(II) carbonate or copper(II) hydroxide can be used initially, but in this case hydrobromic acid must additionally be used, to produce copper(II) bromide first. The possibility of being able to use hydrated copper(II) salts or their aqueous solutions is important since they are much more readily available than the anhydrous copper(II) salts and in this way the costly removal of water can be avoided.

Hydrobromic acid can be most conveniently used in the form of an up to 60% aqueous solution, preferably as a 48% solution. However, gaseous hydrogen bromide can also be used.

Suitable secondary amines contain about 4 to 10 carbon atoms. In particular, they are aliphatic amines, for example, diethylamine, N-methyl-N-propylamine, di-n-butylamine; or cyclic amines, such as pyrrolidine or piperidine. Amine mixtures can also be used. Preferably, amines with a bonded oxygen are used, such as morpholine.

At least 1.5 equivalents of secondary amine are required per equivalent of the bivalent copper salt, but, relative to y number of moles of the diorthosubstituted phenol used, less than y/3. The amount of aminohydrobromide is between 0.5 and 6 equivalents of copper salt.

The amount of water present in the reaction solution at the end of the polycondensation can amount to about 7 percent by volume of the total reaction mixture. This water is formed to a certain extent during polycondensation. However, as evident from the upper limits, it can also be present in substantial proportion at the beginning of the reaction, depending on whether aqueous copper salts, aqueous copper salt solutions or aqueous amines are chosen beside the aqueous HBr solution.

The process according to the invention is performed with 2,6-disubstituted phenols of the general formula

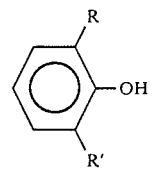

wherein R is R' are an n-alkyl radical with 1 to about 6 carbon atoms or a phenyl radical. 2,6-dimethylphenol is preferable.

Polycondensation takes place in a solvent mixture consisting of an aromatic hydrocarbon, for example, benzene, toluene, xylene, ethylbenzene and styrene, on the one hand, a lower aliphatic alcohol with 1 to about 4 carbon atoms, on the other hand. A mixture toluene and methyl alcohol is preferable.

The ratio by volume of aromatic to aliphatic components can be between about 92.5:7.5 and 50:50 with the limitation that high-molecular weight PPO precipitates as a result of too high a proportion of aliphatic alcohols. This should be avoided as much as possible. A mixture of toluene and methyl alcohol in a ratio of about 90:10 to 85:15 has been found to be most favorable, with which the J value can be considerably increased in comparison with the operation with pure toluene (see comparison example B). A great advantage of the present process is that mixtures of oxygen with one or more inert gases, such as nitrogen or argon, with a minimum oxygen content of 10 percent by volume, can be used. For example, mixtures having about 10 to 40% oxygen may be used. Air is preferably used. It was found that even very small amounts of carbon dioxide in the gas mixture containing $O_2$ have an unfavorable effect on the course of the reaction. Thus, for example, with the use of air free of carbon dioxide, under otherwise similar conditions, the reaction time can be cut around 20 to 30% and also the formation of tetramethyldiphenoquinone drops considerably (see comparison example A). Although there are indications (Inorg. Chem. 18, 2296 (1979) and 19, 201 (1980)) that special copper-n-tetramethyl-1,3-propane or 1,2-ethanediamine carbonate complexes promote the formation of diphenooquinone, still it is surprising that even a portion as small as 0.03 percent by volume of carbon dioxide in the air significantly affects the increased formation of this undesirable byproduct.

With respect to the temperature of which the oxidative coupling reaction is effected, a temperature in the range of 20° to 60° C. is preferred. Even more preferable, however, is a temperature in the range of 30° to 50° C.

After the desired degree of polymerization has been reached, the polycondensation is stopped, for example, by addition of acid and the PPO is isolated in a conventional manner.

The PPO obtained by the process according to the invention can be used either as such or as a copolymer for the production of heat stable preforms.

The present invention will be further illustrated by certain examples and references which are provided for purposes of illustration only and are not intended to limit the present invention.

EXAMPLE 1

Production of catalyst:

1.95 g of $CuCO_3 \cdot Cu(OH)_2$ were dissolved in 7.7 g of hydrobromic acid (48%) and to the resulting homogeneous solution was added 30 g of morpholine with stirring.

Production of poly-(2,6-dimethyl-1,4-phenylenoxide):

The catalyst produced above was combined in a 3-liter agitated reactor with a mixture of 1300 g of toluene and 207 g of methyl alcohol. 30 g of a 50% solution of 2,6-dimethylphenol in toluene are added and the polycondensation was started with stirring (750 rpm) by introduction of an air current ($CO_2 < 10$ ppm) of 200 l/h. The reaction temperature was kept constant at 30° After 10 minutes, another 270 g of the toluene dimethylphenol solution was dropped in over a period of 30 minutes. The polycondensation was stopped 60 minutes after completion of the addition, by adding 200 ml of 50% acetic acid. From the organic phase then isolated, the polyphenylene oxide was precipitated by adding 1300 g of methyl alcohol with stirring. The product was filtered off by suction, washed with methyl alcohol with stirring. The product was filtered off by suction, washed with methyl alcohol and then dried for 8 hours at 100° C. in an oil pump vacuum.

J = 79 mg/g.

Diphenoquinone content: <100 ppm.

EXAMPLE 2

5.1 g of $CuBr_2 \cdot 4H_2O$ was dissolved in 207 g of methyl alcohol and 2 g of 48% aqueous HBr and this solution was combined with a mixture of 30 g of morpholine and 1300 g of toluene. The other procedures were the same as in example 1.

J = 76 ml/g.

Diphenonoquinone content: <100 ppm.

EXAMPLE 3

3.9 of $CuBr_2$ was dissolved in 5.7 g of HBr (48%) and 207 g of methyl alcohol and the procedure of example 2 was then followed.

J = 86 ml/g.

Diphenonoquinone content: <100 ppm.

EXAMPLE 4

Example 1 was duplicated except that 45 g of dibutylamine are used instead of 30 g of morpholine.

J = 76 ml/g.

Diphonoquinone content: <100 ppm.

EXAMPLE 5

Example 3 was duplicated except that 3.0 g of $CuCl_2 \cdot 2H_2O$ was used instead of 3.9 g of $CuBr_2$.

J = 75 ml/g.

Diphenonoquinone content: <100 ppm.

EXAMPLE 6

Example 1 was duplicated except that 45 g of piperidine was used instead of 30 g of morpholine.

J = 74 ml/g.

Diphenonoquinone content: <100 ppm.

EXAMPLE 7

Example 1 was duplicated except that 160 g of 2-n-butyl-6-methylphenol was used instead of 2,6-dimethylphenol.

J = 65 ml/g.

Diphenonoquinone content: <100 ppm.

EXAMPLE 8

Example 1 was duplicated except that 180 g of 2-methyl-6-phenylphenol was used instead of 2,6-dimethylphenol. The reaction temperature is 45° C.

J = 60 ml/g.

Diphenonoquinone: <200 ppm.

COMPARISON EXAMPLE A

Example 1 was duplicated except that air with a carbon dioxide content of 300 ppm was used.

J=67.5 ml/g.
Diphenonoquinone content: 0.15%

COMPARISON EXAMPLE B

Example 1 was duplicated except that only 1507 g of toluene was used instead of a solvent mixture of 1300 g of toluene and 207 g of methyl alcohol.
J=22 ml/g.
Diphenoquinone content: <100 ppm.

Having fully described their invention, it will now be apparent to one of ordinary skill in the art that many changes and modifications can be made thereto without departing from the spirit or scope of the invention as set forth herein.

What is claimed as new and desired to be secured by Letters Patent of the United States is:

1. A process for the production of polyphenylene oxides which comprises oxidatively coupling a diorthosubstituted phenol having the formula:

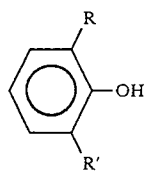

wherein R and R' are $C_1$–$C_6$ n-alkyl or phenyl, in the presence of an oxidizing gas and an activated copper (II)-amine catalyst, consisting of a mixture of
   (a) equivalents of a copper salt, $CuX_2$ of the formula wherein X is the anion of an organic acid or an inorganic acid;
   (b) equivalents of a secondary $C_4$–$C_{10}$ aliphatic or cyclic amine; and
   (c) equivalents of a hydrobromide of the same or a different secondary $C_4$–$C_{10}$ aliphatic or cyclic amine; in a solvent mixture of a $C_6$–$C_8$ aromatic hydrocarbon and a lower aliphatic alcohol in a ratio of 92.5:75 to 50:50; thereby preventing precipitation of the formed polyphenylene oxide during reaction.

2. The process for the production of polypheylene oxides according to claim 1, wherein the activated copper (II)-amine catalyst further comprises such an amount of water so that its amount present in the reaction solution at the end of the polycondensation can amount to about 7% by volume of the total reaction mixture.

3. The process for the production of polyphenylene oxides according to claim 1, wherein the following relationships govern the molar amounts of (a), (b), (c) and (y):

$(y)/3 > (b) \geq 1.5(a)$, and $6(a) > (c) > 0.5(a)$, and (y) being the equivalents of the diorthosubstituted phenol.

4. The process for the production of polyphenylene oxides according to claim 1, wherein said oxidative coupling rection is effected at a temperature in the range of 20° to 60° C.

5. The process for the production of polyphenylene oxides according to claim 4, wherein said oxidative coupling reaction is effected at a temperature in the range of 30° to 50° C.

6. The process for the production of polyphenylene oxides according to claim 1, wherein the volume ratio of said aromatic to said aliphatic components is about 90:10 to 85:15.

7. The process for the production of polyphenylene oxides according to claim 1, wherein said oxidizing gas is a mixture of oxygen and an inert gas wherein oxygen comprises about 10 to 40% of said mixture.

8. The process for the production of polyphenylene oxides according to claim 7, wherein said oxidizing gas is air.

9. The process for the production of polyphenylene oxides according to claim 1, wherein said oxidizing gas has less than about 300 ppm of carbon dioxide.

10. The process for the production of polyphenylene oxides according to claim 9, wherein said oxidizing gas has less than about 10 ppm of carbon dioxide.

11. The process for the production of polyphenylene oxides according to claim 1, wherein said copper salt is selected from the group consisting of copper(II) chloride, copper(II) bromide, and copper(II) sulfate.

12. The process for the production of polyphenylene oxides according to claim 11, wherein said copper(II) bromide is generated in-situ by the reaction of copper(II) carbonate or copper(II) hydroxide with hydrobromic acid.

13. The process for the production of polyphenylene oxides according to claim 1, wherein said secondary aliphatic amines are diethylamine, N-methyl-N-propylamine, and di-N-butylamine and said secondary cyclic amines are pyrolidine, piperidine and morpholine.

14. The process for the production of polyphenylene oxides according to claim 1, wherein said aromatic hydrocarbon is benzene, toluene, xylene, ethylbenzene and styrene and said lower aliphatic alcohol is methanol.

15. The process for the production of polyphenylene oxides according to claim 1, wherein said diorthosubstituted phenol is 2,6-dimethylphenol.

* * * * *